US012687676B2

(12) United States Patent
Sugiyama

(10) Patent No.: US 12,687,676 B2
(45) Date of Patent: Jul. 21, 2026

(54) OPTICAL CHIP AND OPTICAL COMMUNICATION APPARATUS

(71) Applicant: FUJITSU OPTICAL COMPONENTS LIMITED, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 325 days.

(21) Appl. No.: 18/227,776

(22) Filed: Jul. 28, 2023

(65) Prior Publication Data

US 2024/0077673 A1     Mar. 7, 2024

(30) Foreign Application Priority Data

Sep. 2, 2022    (JP) ................................. 2022-140291

(51) Int. Cl.
    *G02B 6/125*         (2006.01)
    *G01M 11/00*         (2006.01)
    G02B 6/12            (2006.01)

(52) U.S. Cl.
    CPC ............. *G02B 6/125* (2013.01); *G01M 11/30* (2013.01); *G02B 2006/12147* (2013.01)

(58) Field of Classification Search
    None
    See application file for complete search history.

(56) References Cited

U.S. PATENT DOCUMENTS

| | | | |
|---|---|---|---|
| 5,018,817 A | 5/1991 | Suzuki et al. | |
| 9,766,410 B1 * | 9/2017 | Chen ...................... | G02B 6/124 |
| 10,042,131 B1 | 8/2018 | Lesea | |
| 11,531,172 B2 * | 12/2022 | Wu ...................... | G02B 6/12009 |
| 2014/0043050 A1 * | 2/2014 | Stone ................. | H04B 17/0082 |
| | | | 324/750.01 |
| 2016/0290891 A1 * | 10/2016 | Feng ........................ | H01L 22/10 |
| 2016/0306111 A1 * | 10/2016 | Lambert .............. | G02B 6/4214 |
| 2019/0293866 A1 | 9/2019 | Novack et al. | |
| 2019/0372664 A1 * | 12/2019 | Sugiyama .............. | H04B 10/40 |
| 2020/0136728 A1 * | 4/2020 | Sugiyama ............ | G02B 6/4201 |
| 2021/0356684 A1 * | 11/2021 | Wu ...................... | G02B 6/2935 |

FOREIGN PATENT DOCUMENTS

| | | |
|---|---|---|
| CN | 112698448 A | 4/2021 |
| JP | 64-29810 | 1/1989 |
| JP | 2019-211538 | 12/2019 |
| JP | 2020-516932 | 6/2020 |
| WO | WO 03/001174 A1 | 1/2003 |
| WO | WO 2018/186999 A1 | 10/2018 |
| WO | WO 2020/132968 A1 | 7/2020 |

OTHER PUBLICATIONS

Japanese Office Action issued in counterpart Japanese Application No. 2022-140291 dated Mar. 31, 2026.

* cited by examiner

*Primary Examiner* — Jerry Rahll
(74) *Attorney, Agent, or Firm* — STAAS & HALSEY LLP

(57)                ABSTRACT

An optical chip includes a chip area located on a wafer, and an optical circuit arranged in the chip area. The optical chip includes a first waveguide that is connected to a first operational fiber, a second waveguide, and a first coupler that includes a first port that is connected to the first waveguide and the second waveguide and a second port that is connected to the optical circuit. Furthermore, the optical chip includes a first trench that is formed on a surface of the chip area, that is connected to the second waveguide, and in which a first test purpose fiber is inserted.

14 Claims, 12 Drawing Sheets

FIG.6

OPTICAL CHIP AND OPTICAL COMMUNICATION APPARATUS

CROSS-REFERENCE TO RELATED APPLICATION

This application is based upon and claims the benefit of priority of the prior Japanese Patent Application No. 2022-140291, filed on Sep. 2, 2022, the entire contents of which are incorporated herein by reference.

FIELD

The embodiments discussed herein are related to an optical chip and an optical communication apparatus.

BACKGROUND

FIG. 9 is a diagram illustrating one example of a test system 300 that is conventionally used. The test system 300 illustrated in FIG. 9 includes an optical chip 301 and a test apparatus 302. The test apparatus 302 includes a light source 321, a polarization controller 322, an optical power meter 323, a first test purpose fiber 324, and a second test purpose fiber 325. The light source 321 is a laser diode (LD) that emits test light. The polarization controller 322 is a controller that controls a polarized wave of the test light emitted from the light source 321. The first test purpose fiber 324 is an optical fiber that is optically connected to the optical chip 301 and that is used to input the test light that has been subjected to polarization adjustment and that is received from the polarization controller 322. The second test purpose fiber 325 is an optical fiber that is connected to the optical chip 301. The optical power meter 323 is a meter that measures power of the test light received from the second test purpose fiber.

The optical chip 301 includes a chip area 310, an optical circuit 311, a first waveguide 312, a first coupler 313, a first edge coupler (EC) 314, a second waveguide 315, a second coupler 316, and a second EC 317. The optical circuit 311 is a transmitting circuit or a receiving circuit that is arranged in, for example, the chip area 310. The first waveguide 312 is an optical waveguide that is arranged in, for example, the chip area 310 and that optically couples a portion between the first coupler 313 and the first EC 314. The first coupler 313 is a 1×2 coupler that optically couples a portion between the first waveguide 312 and the optical circuit 311. The first EC 314 is a coupler that is arranged on a chip end surface of the optical chip 301 and that optically couples a portion between the first waveguide 312 and the first test purpose fiber 324.

The second waveguide 315 is an optical waveguide that is arranged in, for example, the chip area 310 and that optically couples a portion between the second coupler 316 and the second EC 317. The second coupler 316 is a 1×2 coupler that optically couples a portion between the second waveguide 315 and the optical circuit 311. The second EC 317 is a coupler that is arranged on the chip end surface of the optical chip 301 and that optically couples a portion between the second waveguide 315 and the second test purpose fiber 325.

The first coupler 313 branches the test light received from the first waveguide 312 and outputs the branched test light to the transmitting circuit and the receiving circuit that are included in the optical circuit 311. The second coupler 316 outputs, to the second waveguide 315, the test light that has been subjected to a transmission process performed in the transmitting circuit or the test light that has been subjected to a reception process performed in the receiving circuit.

Furthermore, if the second coupler 316 receives an input of the test light that has been subjected to the transmission process and that is received from the transmitting circuit, the second coupler 316 outputs the test light that has been subjected to the transmission process to the second waveguide 315. In addition, the second EC 317 outputs, to the optical power meter 323 via the second test purpose fiber 325, the test light that has been subjected to the transmission process received from the second waveguide 315. Consequently, the optical power meter 323 is able to measure optical power of the test light that has been subjected to the transmission process.

Furthermore, if the second coupler 316 receives an inputs of the test light that has been subjected to the reception process and that is received from the receiving circuit, the second coupler 316 outputs the test light that has been subjected to the reception process to the second waveguide 315. In addition, the second EC 317 outputs the test light that has been subjected to the reception process received from the second waveguide 315 to the optical power meter 323 via the second test purpose fiber 325. Consequently, the optical power meter 323 is able to measure optical power of the test light that has been subjected to the reception process.

In the test apparatus 302, after the optical chip 301 has been set on a test purpose stage one by one, the first test purpose fiber 324 is connected to the first EC 314, and also, the second test purpose fiber 325 is connected to the second EC 317. However, an alignment work is troublesome at the time of connection between, for example, the first EC 314 that is located at the chip end surface and the first test purpose fiber 324, so that the working efficiency is consequently decreased.

Accordingly, there is a known test system that is able to perform a test in a wafer state that is before the optical chip 301 is formed into a chip. FIG. 10 is a diagram illustrating one example of an optical chip 301A that is conventionally used. In addition, component elements included in the optical chip 301A that has the same configuration and operation as the component elements included in the test system 300 illustrated in FIG. 9 will be denoted by the same reference numerals, and overlapped descriptions of the configuration and the operation of the component elements will be omitted. An optical chip area 301A1 is in a state of wafer that is before formed into a chip. The wafer includes an optical chip area 301A1 and a test area 301A2, and is constituted such that a boundary line located between the optical chip area 301A1 and the test area 301A2 is able to be cut by a dicing line 301C. The optical chip area 301A1 includes the optical circuit 311, the first waveguide 312, the first coupler 313, and the first EC 314. The optical chip area 301A1 includes the second waveguide 315, the second coupler 316, and the second EC 317.

The test area 301A2 includes a first test purpose waveguide 331 that is optically connected to the first EC 314 and a second test purpose waveguide 332 that is optically connected to the second EC 317. The test area 301A2 is arranged on a wafer surface, and includes a first grating coupler (GC) 333 that optically connects a portion between the first test purpose fiber 324 and the first test purpose waveguide 331. The test area 301A2 is arranged on the wafer surface, and includes a second GC 334 that optically connects a portion between the second test purpose waveguide 332 and the second test purpose fiber 325. Furthermore, the test area 301A2 includes an optical fiber array 335 that is arranged on the wafer surface and that optically connects a portion between the first test purpose fiber 324 and the first GC 333 and that optically connects a portion between the second test purpose fiber 325 and the second GC 334. In addition, the first test purpose fiber 324 is connected to the light source 321 via the polarization controller 322, whereas the second test purpose fiber 325 is connected to the optical power meter 323.

A portion between the first test purpose fiber 324 and the first GC 333 and a portion between the second test purpose fiber 325 and the second GC 334 are optically coupled by moving the optical fiber array 335 closer to the GC from the direction of the wafer surface. Consequently, it is possible to perform a test in a wafer state, and, as a result, it is possible to improve enhancement of the working efficiency needed for the measurement.

However, the GC exhibits a high wavelength dependence property and a loss is different in accordance with the wavelength of light, and, in addition, an intensity of reflected return light is high; therefore, the test light is largely affected by the reflected return light. In addition, variation arises in a loss that is dependent on manufacturing accuracy of the GC. As a result, the measurement accuracy of the measurement performed by using the GC is degraded.

Accordingly, it is conceivable to use an optical chip that does not use a GC. FIG. 11 is a diagram illustrating one example of an optical chip 301B that is conventionally used. In addition, component elements included in the optical chip 301B that has the same configuration and operation as the component elements included in the optical chip 301A illustrated in FIG. 10 will be denoted by the same reference numerals, and overlapped descriptions of the configuration and the operation of the component elements will be omitted. A test area 301D includes the first test purpose waveguide 331 that is optically connected to the first EC 314, the second test purpose waveguide 332 that is optically connected to the second EC 317, and a trench 341 that is formed on the wafer surface. By inserting the first test purpose fiber 324 from the side surface of the trench 341, the first test purpose fiber 324 is optically connected to the first test purpose waveguide 331. Furthermore, by inserting the second test purpose fiber 325 from the side surface of the trench 341, the second test purpose fiber 325 is optically connected to the second test purpose waveguide 332.

Consequently, it is possible to constitute a structure such that the first test purpose fiber 324 is optically connected to the first test purpose waveguide 331 without using the GC and the second test purpose fiber 325 is optically connected to the second test purpose waveguide 332 without using the GC, so that it is possible to improve the measurement accuracy.

Patent Document 1: Japanese National Publication of International Patent Application No. 2020-516932
Patent Document 2: U.S. Patent Application Publication No. 2019/0293866
Patent Document 3: Japanese Laid-open Patent Publication No. 01-29810
Patent Document 4: International Publication Pamphlet No. WO 2020/132968

However, with the optical chip 301B that is conventionally used, as the trench 341 that is formed in the test area 301D that is other than the optical chip area 301A1 that is provided on the wafer, there is a need to ensure a sufficient size in order for the end surface of the test purpose fiber to be optically coupled to the test purpose waveguide. Therefore, there is a need to increase the test area 301D that is provided on the wafer. However, if the test area 301D is enlarged on the wafer, the number of the optical chips 301B that can be obtained from a single wafer is reduced.

SUMMARY

According to an aspect of an embodiment, an optical chip includes a chip area located on a wafer and an optical circuit arranged in the chip area. The optical chip includes a first waveguide that is connected to a first operational fiber, a second waveguide, a first coupler and a first trench. The first coupler includes a first port that is connected to the first waveguide and that is connected to the second waveguide, and a second port that is connected to the optical circuit. The first trench is formed on a surface of the chip area and is connected to the second waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating one example of an optical chip according to a sixth embodiment.

DESCRIPTION OF EMBODIMENTS

Preferred embodiments of the present invention will be explained with reference to accompanying drawings. Furthermore, the present invention is not limited to the embodiments. In addition, each of the embodiments can be used in any appropriate combination as long as they do not conflict with each other.

(a) First Embodiment

Figure 1:
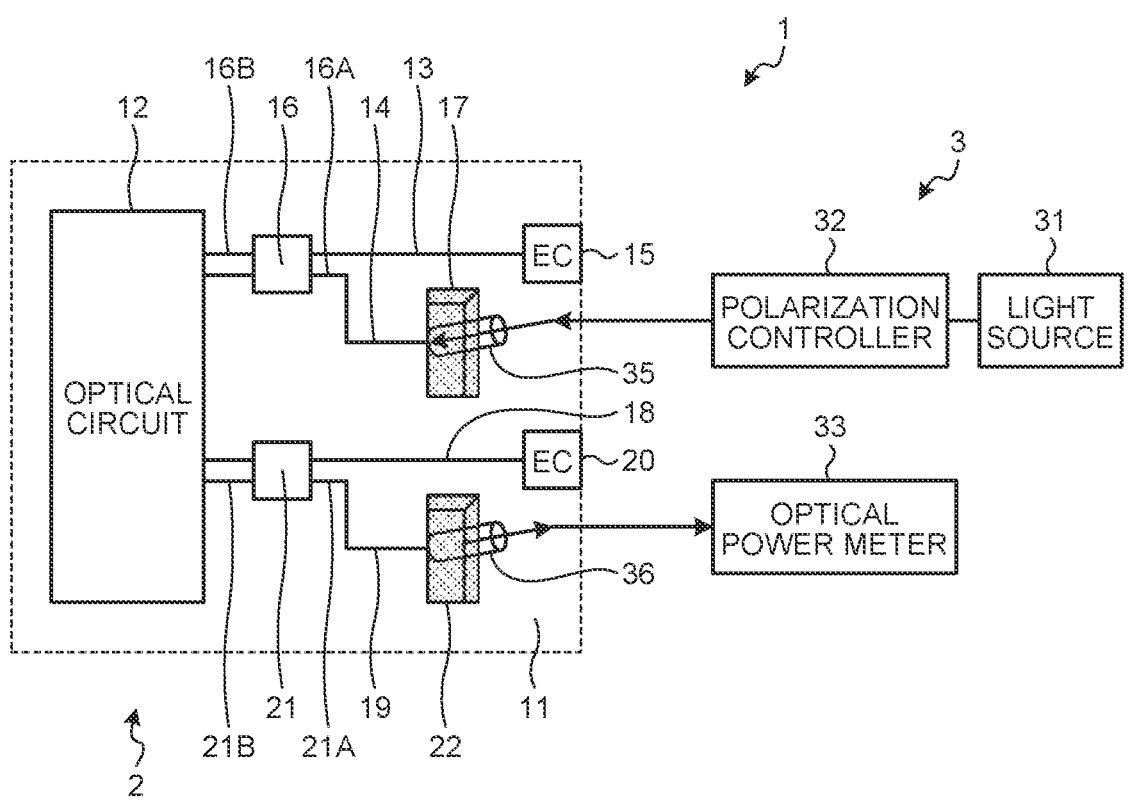
FIG. 1 is a diagram illustrating one example of a test system according to a first embodiment.

FIG. 1 is a diagram illustrating one example of a test system 1 according to a first embodiment. The test system 1 illustrated in FIG. 1 includes an optical chip 2 and a test apparatus 3. The test apparatus 3 includes a light source 31, a polarization controller 32, an optical power meter 33, a first test purpose fiber 35, and a second test purpose fiber 36.

The light source 31 is a LD that emits test light. The polarization controller 32 is a controller that controls a polarized wave of the test light emitted from the light source 31. The first test purpose fiber 35 is an optical fiber that is optically connected to the optical chip 2 and that inputs the test light that has been subjected to polarization adjustment and that is received from the polarization controller 32. The second test purpose fiber 36 is an optical fiber that is connected to the optical chip 2. The optical power meter 33 is a meter that measures power of the test light that is output from the second test purpose fiber 36.

The optical chip 2 includes a chip area 11 that is provided on a wafer, and an optical circuit 12 that is arranged in the chip area 11. The optical circuit 12 includes a transmitting circuit and a receiving circuit. The optical chip 2 includes a first waveguide 13, a second waveguide 14, a first edge coupler (EC) 15, a first coupler 16, and a first trench 17. The first waveguide 13 is an optical waveguide that optically couples a portion between the first EC 15 and the first coupler 16. The first EC 15 is an EC that is connected to the first operational fiber. The first coupler 16 is a 2×2 optical coupler that includes a first port 16A that is connected to the first waveguide 13 and that is also connected to the second waveguide 14, and a second port 16B that is connected to the transmitting circuit included in the optical circuit 12 and that is also connected to the receiving circuit included in the optical circuit 12. The first trench 17 is a groove that is formed on the surface of the chip area 11, and that is used to be connected to the second waveguide 14 by allowing the first test purpose fiber 35 to be inserted into the first trench 17.

The optical chip 2 includes a third waveguide 18, a fourth waveguide 19, a second EC 20, a second coupler 21, and a second trench 22. The third waveguide 18 is an optical waveguide that optically couples a portion between the second EC 20 and the second coupler 21. The second EC 20 is an EC that is connected to the second operational fiber. The second coupler 21 is a 2×2 optical coupler that includes a third port 21A that is connected to the third waveguide 18 and that is also connected to the fourth waveguide 19, and a fourth port 21B that is connected to the transmitting circuit included in the optical circuit 12 and that is also connected to the receiving circuit included in the optical circuit 12. The second trench 22 is a groove that is formed on the surface of the chip area 11, and that is used to be connected to the fourth waveguide 19 by allowing the second test purpose fiber 36 to be inserted into the second trench 22.

The first coupler 16 branches the test light received from the second waveguide 14 and outputs the branched test light to the transmitting circuit and the receiving circuit. The second coupler 21 outputs, to the third waveguide 1 and the fourth waveguide 19, the test light that has been subjected to a transmission process and that is received from the transmitting circuit or the test light that has been subjected to a reception process and that is received from the receiving circuit and.

In addition, each of the first coupler 16 and the second coupler 21 is constituted of the 2×2 coupler, so that a branching ratio is stabilized in terms of an input and an output in the case where the structure of 2 inputs and 2 outputs is constituted. As a result, an optical loss does not occur and the intensity of light entering the optical circuit 12 becomes strong, so that it is possible to improve the measurement accuracy. However, the structure may be constituted by using a 1×2 coupler, and, in this case, although an optical loss of 3 dB occurs, improvement of the measurement accuracy is observed to some extent.

In the following, an operation of the test system 1 according to the first embodiment will be described. A test is started in a state of a wafer for the optical chip 2. By inserting the end surface of the first test purpose fiber 35 into the first trench 17, a portion between the first test purpose fiber 35 and the second waveguide 14 is optically connected. By inserting the end surface of the second test purpose fiber 36 into the second trench 22, a portion between the second test purpose fiber 36 and the fourth waveguide 19 is optically connected.

After having performed a polarization adjustment process on the test light emitted from the light source 31, the polarization controller 32 inputs the test light that has been subjected to the polarization adjustment to the first test purpose fiber 35. The first coupler 16 branches the test light received from the first test purpose fiber 35 and outputs the branched test light to the transmitting circuit or the receiving circuit included in the optical circuit 12. The transmitting circuit performs a usual transmission process on the test light that has been subjected to the polarization adjustment, and then outputs the test light that has been subjected to the transmission process to the second coupler 21. In addition, the receiving circuit performs a usual reception process on the test light that has been subjected to the polarization adjustment, and then outputs the test light that has been subjected to the reception process to the second coupler 21.

If the second coupler 21 receives an input of the test light that has been subjected to the transmission process from the transmitting circuit included in the optical circuit 12 or receives an input of the test light that has been subjected to the reception process from the receiving circuit included in the optical circuit 12, the second coupler 21 outputs the test light to the fourth waveguide 19. The optical power meter 33 measures the power of the test light received from the fourth waveguide 19 by way of the second test purpose fiber 36. Consequently, it is possible to measure the test light that has been subjected to the transmission process and the test light that has been subjected to the reception process performed in the optical chip 2.

With the optical chip 2 according to the first embodiment, a portion between the second waveguide 14 and the first test purpose fiber 35 located in the first trench 17 is optically coupled, and a portion between the fourth waveguide 19 and the second test purpose fiber 36 located in the second trench 22 is optically coupled. Consequently, it is possible to perform a test of the optical circuit 12 by using optical coupling, and it is thus possible to improve the accuracy of the measurement performed in a wafer state. In addition, by providing the first trench 17 and the second trench 22 in a free space included in the optical chip 2, it is possible to ensure the number of the optical chips 2 per wafer.

In other words, in the first embodiment, the trench has been arranged in the free space included in the optical chip 2 instead of a test area that is conventionally applied, so that it is possible to ensure the number of the optical chips 2 per wafer. In addition, a GC is not used, so that the test light is not affected by reflected light, and it is thus possible to stabilize a measurement value by preventing the light source from being unstable.

With the optical chip 2 according to the first embodiment, the side surface of the first trench 17 is orthogonal to the second waveguide 14, so that the test light and the reflected light has the same light traveling direction, and an influence of the reflected light is increased. Accordingly, an embodiment of solving this circumstance will be described below as a second embodiment.

(b) Second Embodiment

Figure 2:
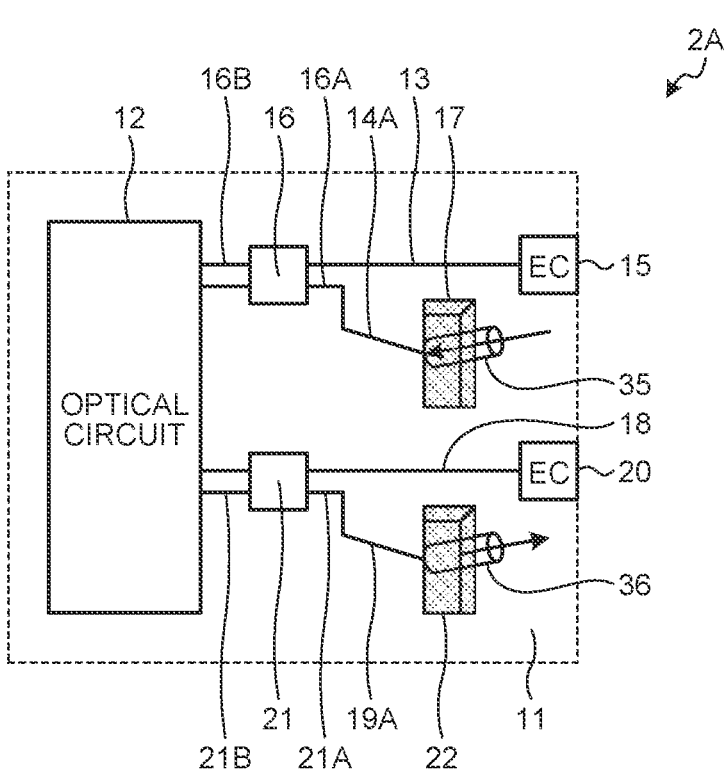
FIG. 2 is a diagram illustrating one example of an optical chip according to a second embodiment.

FIG. 2 is a diagram illustrating one example of an optical chip 2A according to the second embodiment. In addition, component elements included in the test system according to the second embodiment that have the same configuration and operation as the component elements included in the test system 1 according to the first embodiment will be denoted by the same reference numerals, and overlapped descriptions of the configuration and the operation of the component elements will be omitted. The optical chip 2A illustrated in FIG. 2 is different from the optical chip 2 illustrated in FIG. 1 in that, a second waveguide 14A is arranged at a position inclined with respect to the side surface of the first trench 17 at an angle of about 10 degrees. Similarly, the optical chip 2A is different from the optical chip 2 in that a fourth waveguide 19A is arranged at a position inclined with respect to the side surface of the second trench 22 at an angle of about 10 degrees.

The second waveguide 14A is arranged at a position that is not orthogonal to the side surface that is connected to the second waveguide 14A from among the side surfaces of the first trench 17, such as at a position that is, for example, inclined at an angle of about 10 degrees, so that the reflected light with respect to the test light is prevented from entering the second waveguide 14A. Consequently, it is possible to decrease the intensity of the reflected light with respect to the test light, and it is thus possible to enhance the measurement accuracy.

The fourth waveguide 19A is arranged at a position, such as a position that is, for example, inclined at an angle of about 10 degrees, that is not orthogonal to the side surface that is included in the side surfaces of the second trench 22 and that is connected to the fourth waveguide 19A, so that the reflected light with respect to the test light is prevented from entering the fourth waveguide 19A. Consequently, it is possible to decrease the intensity of the reflected light with respect to the test light, and it is thus possible to enhance the measurement accuracy.

In addition, a case has been described as an example in which the optical chip 2A according to the second embodiment includes both of the second waveguide 14A and the fourth waveguide 19A; however, the structure may be constituted by using either a case in which the second waveguide 14A is replaced with the second waveguide 14 or a case in which the fourth waveguide 19A is replaced with the fourth waveguide 19, and appropriate modifications are possible.

With the optical chip 2A according to the second embodiment, a case has been described as an example in which the second waveguide 14A is arranged so as to be inclined with respect to the first trench 17; however, a coupling loss is increased at a portion between the second waveguide 14A and the first test purpose fiber 35 that is inserted into the first trench 17. In addition, a coupling loss is increased at a portion between the fourth waveguide 19A and the second test purpose fiber 36 that is inserted into the second trench 22. Accordingly, in order to cope with the circumstances, an embodiment thereof will be described below as a third embodiment.

(c) Third Embodiment

Figure 3:
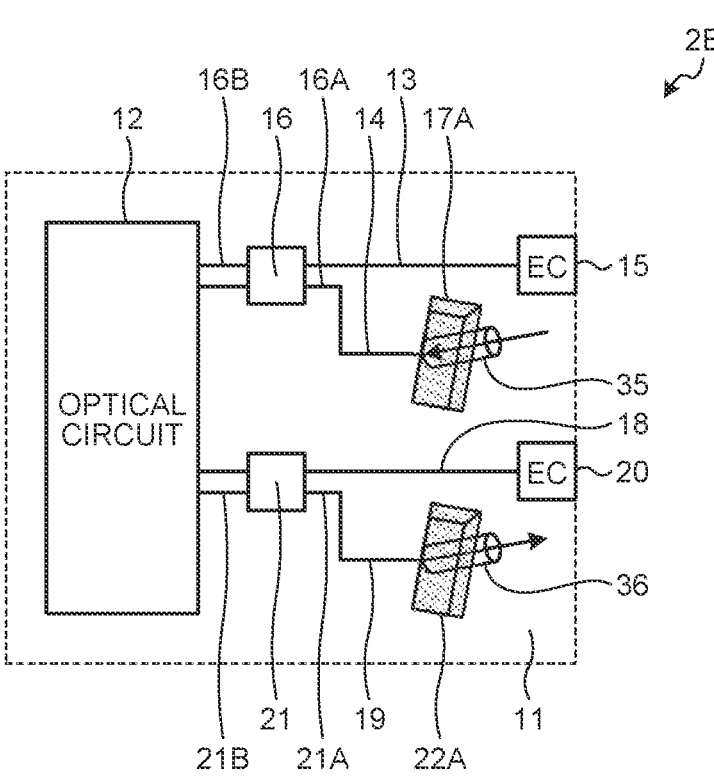
FIG. 3 is a diagram illustrating one example of an optical chip according to a third embodiment.

FIG. 3 is a diagram illustrating one example of an optical chip 2B according to the third embodiment. In addition, by assigning the same reference numerals to component elements having the same configuration as those included in the test system 1 according to the first embodiment, overlapped descriptions of the configuration and the operation of the component elements will be omitted. The optical chip 2B according to the third embodiment is different from the optical chip 2 according to the first embodiment in that a first trench 17A is arranged at a position inclined at an angle of about 10 degrees with respect to the left and right sides of the optical chip 2B, a second trench 22A is arranged at a position inclined at an angle of about 10 degrees with respect to the left and right sides of the optical chip 2B.

The first trench 17A is arranged at a position inclined at an angle of about 10 degrees with respect to the left and right sides of the optical chip 2B. In the first trench 17A, the side surface of the first trench 17A that is connected to the second waveguide 14 is arranged at a position inclined with respect to the side of the optical chip 2B. Therefore, it is possible to prevent the reflected light with respect to the test light from entering the second waveguide 14 while reducing the coupling loss at a position between the second waveguide 14 and the first test purpose fiber 35 that is inserted into the first trench 17A. Consequently, it is possible to improve enhancement of the measurement accuracy of the measurement caused by reflected light while reducing the coupling loss.

The second trench 22A is arranged at a position inclined at an angle of about 10 degrees with respect to the left and right sides of the optical chip 2B. In the second trench 22A, the side surface of the second trench 22A that is connected to the fourth waveguide 19 is arranged at a position inclined with respect to the side of the optical chip 2B. Therefore, it is possible to prevent the reflected light with respect to the test light from entering the fourth waveguide 19 while reducing the coupling loss at a position between the fourth waveguide 19 and the second test purpose fiber 36 that is inserted into the second trench 22A. Consequently, it is possible to improve enhancement of the measurement accuracy of the measurement caused by reflected light while reducing the coupling loss.

In addition, a case has been described as an example in which the optical chip 2B according to the third embodiment includes both of the first trench 17A and the second trench 22A; however, the structure may be constituted by using either a case in which the first trench 17A is replaced with the first trench 17 or a case in which the second trench 22A is replaced with the second trench 22, and appropriate modifications are possible.

However, with the optical chip 2 according to the first embodiment, the first trench 17 (the second trench 22) is used only at the time of a test, but it is conceivable that light reflected at the first trench 17 (the second trench 22) during the operation affects the optical circuit 12. Accordingly, an embodiment of solving this circumstance will be described below as a fourth embodiment.

(d) Fourth Embodiment

Figure 4:
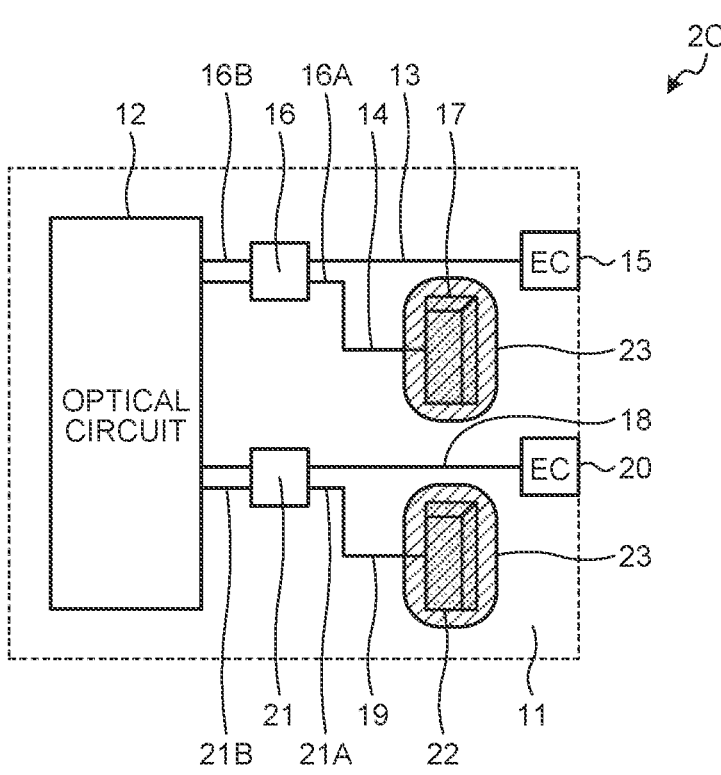
FIG. 4 is a diagram illustrating one example of an optical chip according to a fourth embodiment.

FIG. 4 is a diagram illustrating one example of an optical chip 2C according to the fourth embodiment. In addition, by assigning the same reference numerals to component elements having the same configuration as those included in the test system 1 according to the first embodiment, overlapped descriptions of the configuration and the operation of the component elements will be omitted. The optical chip 2C illustrated in FIG. 4 is characterized in that, after completion of a test, the first test purpose fiber 35 and the second test purpose fiber 36 are removed from the first trench 17 and the second trench 22, respectively, and both of the first trench 17 and the second trench 22 are filled with an optical resin 23.

With the optical chip 2C according to the fourth embodiment, each of the first trench 17 and the second trench 22 are filled with the optical resin 23 after the completion of the test, it is possible to suppress the reflected light that is reflected at the first trench 17 and the second trench 22 and that is generated when an operation is being performed.

In addition, it may possible to use an optical adhesive instead of the optical resin 23, and appropriate modifications are possible.

With the optical chip 2 according to the first embodiment, a case has been described as an example in which a portion between the second waveguide 14 and the first test purpose fiber 35 is optically connected by allowing the first test purpose fiber 35 passing through the first trench 17, and a portion between the fourth waveguide 19 and the second test purpose fiber 36 is optically connected by allowing the second test purpose fiber 36 passing through the second trench 22. However, an embodiment that improves enhancement of optical coupling between the first test purpose fiber 35 and the second waveguide 14 and optical coupling between the second test purpose fiber 36 and the fourth waveguide 19 will be described as a fifth embodiment.

(e) Fifth Embodiment

Figure 5:
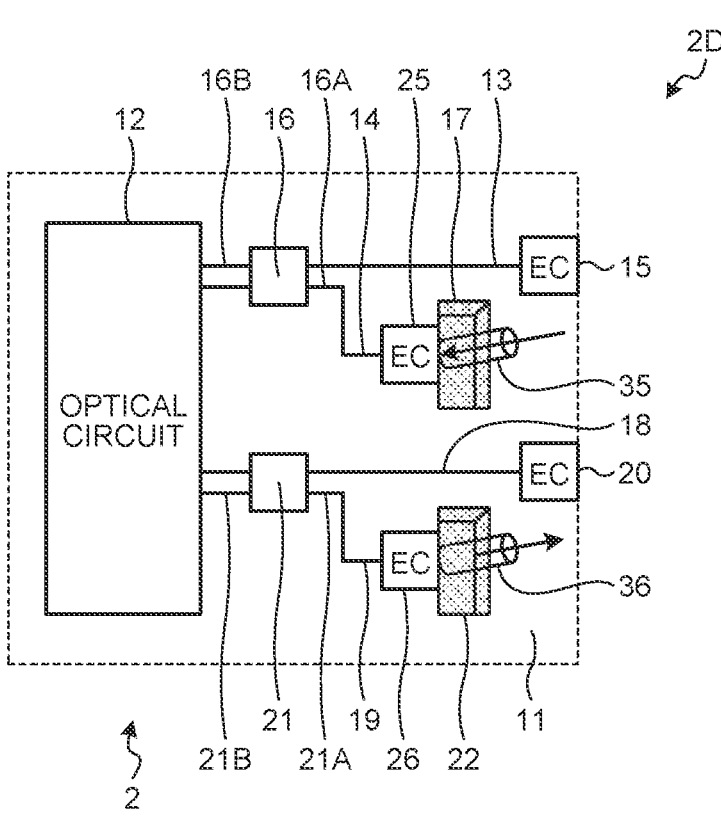
FIG. 5 is a diagram illustrating one example of an optical chip according to a fifth embodiment.

FIG. 5 is a diagram illustrating one example of an optical chip 2D according to the fifth embodiment. In addition, by assigning the same reference numerals to component elements having the same configuration as those included in the test system 1 according to the first embodiment, overlapped descriptions of the configuration and the operation of the component elements will be omitted. The optical chip 2D illustrated in FIG. 5 includes a first test purpose EC 25 that is arranged between the second waveguide 14 and the first trench 17, and a second test purpose EC 26 that is arranged between the fourth waveguide 19 and the second trench 22.

The first test purpose EC 25 is an EC that is agreed with the mode field of the first test purpose fiber 35. The second test purpose EC 26 is an EC that is also agreed with the mode field of the second test purpose fiber 36.

With the optical chip 2D according to the fifth embodiment, the first test purpose EC 25 is arranged between the second waveguide 14 and the first trench 17, and a portion between the second waveguide 14 and the first test purpose fiber 35 is optically coupled by using the first test purpose EC 25. Furthermore, with the optical chip 2D, the second test purpose EC 26 is arranged between the fourth waveguide 19 and the second trench 22, and a portion between the fourth waveguide 19 and the second test purpose fiber 36 is optically coupled by using the second test purpose EC 26. Consequently, each of a portion between the first test purpose fiber 35 and the second waveguide 14 and a portion between the second test purpose fiber 36 and the fourth waveguide 19 is optically coupled at the time of a test, so that it is possible to improve enhancement of the accuracy of the test while improving the coupling efficiency.

In addition, a case has been described as an example in which the first test purpose EC 25 is applied to the EC that is agreed with the mode field of the first test purpose fiber 35; however, the first test purpose EC 25 may be the same EC as the first EC 15 that connects the first operational fiber, or, may also be a spot size convertor (SSC). In addition, a case has been described as an example in which the second test purpose EC 26 is applied to the EC that is agreed with the mode field of the second test purpose fiber 36; however, the second test purpose EC 26 may be the same EC as the second EC 20 that connects the second operational fiber, or, may also be a SSC.

In addition, a case has been described in which the optical circuit 12 included in the optical chip 2 according to the first embodiment includes the transmitting circuit and the receiving circuit as built in units; however, an embodiment of a concrete form of a digital coherent transmitter/receiver will be described as a sixth embodiment.

(f) Sixth Embodiment

Figure 6:
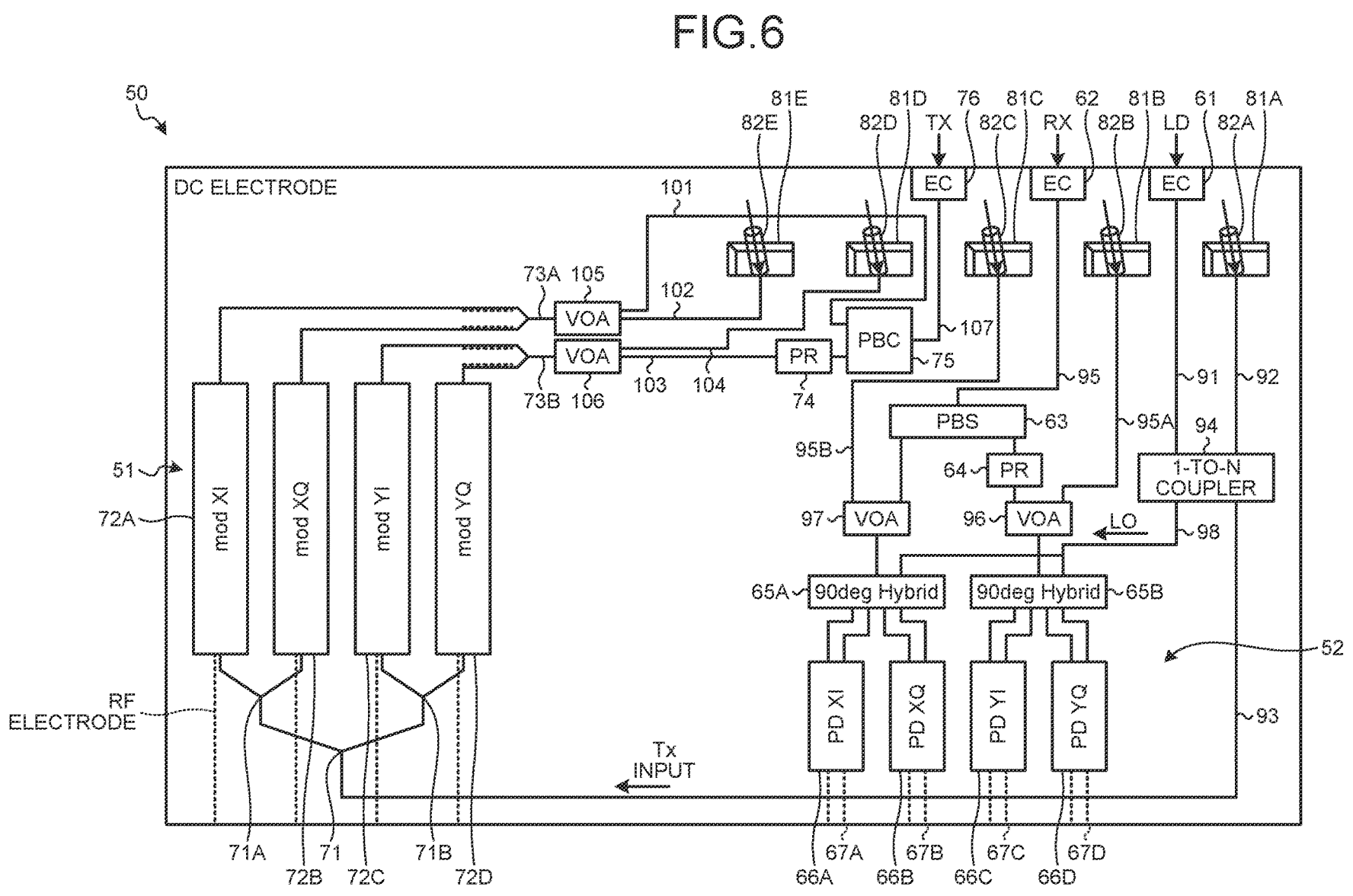

FIG. 6 is a diagram illustrating one example of an optical chip 50 according to the sixth embodiment. The optical circuit included in the optical chip 50 illustrated in FIG. 6 includes a transmitting circuit 51 that has a digital coherent function and a receiving circuit 52 that has a digital coherent function.

The receiving circuit 52 includes a first EC 61 that includes a local emission light port, a second EC 62 that includes a reception light port, a polarization beam splitter (PBS) 63, and a first polarization rotator (PR) 64. The receiving circuit 52 includes a first optical hybrid circuit 65A, a second optical hybrid circuit 65B, a first to a fourth photo diodes (PDs) 66A to 66D, and a first to a fourth output ports 67A to 67D.

The first EC 61 that includes the local emission light port is an EC that is formed at an end portion of the side surface included in the optical chip 50 and that is provided at a port that is connected to the operational fiber that is used to input, for example, the local emission light that is output from the light source. In addition, the local emission light port comes out to the end portion of the side surface of the optical chip 50 as a result of a wafer being fabricated as a chip. The second EC 62 that includes the reception light port is an EC that is formed at an end portion of the side surface included in the optical chip 50 and that is provided at a port that is connected to the operational fiber that is used to input, for example, reception light. In addition, the reception light port comes out to the end surface of the side surface of the optical chip 50 as a result of a wafer being fabricated as a chip.

The PBS 63 splits the reception light received from the second EC 62 that includes the reception light port into two polarization states that are orthogonal with each other, for example, an X polarization component that corresponds to a transverse electric (TE) polarized wave and a Y polarization component that corresponds to a transverse magnetic (TM) polarized wave. In addition, the X polarization component is a horizontal polarization component, whereas the Y polarization component is a vertical polarization component. The PBS 63 outputs the X polarization component included in the reception light to the first optical hybrid circuit 65A. Furthermore, the first PR 64 converts the Y polarization component included in the reception light received from the PBS 63 to the X polarization component and outputs the converted light to the second optical hybrid circuit 65B.

The first optical hybrid circuit 65A acquires an optical signal having an I component and a Q component by allowing the local emission light to interfere with the X polarization component included in the reception light. In addition, the I component is an in-phase component, whereas the Q component is a quadrature component. The first optical hybrid circuit 65A outputs the optical signal having the I component included in the X polarization component to the first PD 66A. The first optical hybrid circuit 65A outputs the optical signal having the Q component included in the X polarization component to the second PD 66B.

The second optical hybrid circuit 65B acquires an optical signal having the I component and the Q component by allowing the local emission light to interfere with the X polarization component included in the reception light. The second optical hybrid circuit 65B outputs the optical signal having the I component included in the X polarization component to the third PD 66C. The second optical hybrid circuit 65B outputs the optical signal having the Q component included in the X polarization component to the fourth PD 66D.

The first PD 66A performs electric conversion on the optical signal that has the I component included in the X polarization component and that has been received from the first optical hybrid circuit 65A, performs gain adjustment on the converted signal, and outputs the electrical signal that has been subjected to the gain adjustment to the first output port 67A. The second PD 66B performs electric conversion on the optical signal that has the Q component included in the X polarization component and that has been received from the first optical hybrid circuit 65A, and performs gain adjustment on the converted signal, and outputs electrical signal that has been subjected to the gain adjustment to the second output port 67B.

The third PD 66C performs electric conversion on the optical signal that has the I component included in the X polarization component and that has been received from the second optical hybrid circuit 65B, performs gain adjustment on the converted signal, and outputs the electrical signal that has been subjected to the gain adjustment to the third output port 67C. The fourth PD 66D performs electric conversion on the optical signal that has the Q component included in the X polarization component and that has been received from the second optical hybrid circuit 65B, performs gain adjustment on the converted signal, and outputs the electrical signal that has been subjected to the gain adjustment to the fourth output port 67D.

The transmitting circuit 51 includes a first branching unit 71, a second branching unit 71A, a third branching unit 71B, a first X polarization modulating unit 72A, a second X polarization modulating unit 72B, a first Y polarization modulating unit 72C, and a second Y polarization modulating unit 72D. The transmitting circuit 51 includes a first multiplexing unit 73A, a second multiplexing unit 73B, a second PR 74, a PBC 75, and a third EC 76 that includes the transmission light port.

The third EC 76 that includes the transmission light port is an EC that is formed at an end portion of the side surface included in the optical chip 50 and that is provided at a port that is connected to the operational fiber that is used to output, for example, transmission light. In addition, the transmission light port comes out to the end portion of the side surface of the optical chip 50 as a result of a wafer being fabricated as a chip. The first branching unit 71 branches and outputs the optical signal associated with the local emission light to the second branching unit 71A and the third branching unit 71B. The second branching unit 71A branches and outputs the optical signal associated with the local emission light to the first X polarization modulating unit 72A and the second X polarization modulating unit 72B. The third branching unit 71B branches and outputs the optical signal associated with the local emission light to the first Y polarization modulating unit 72C and the second Y polarization modulating unit 72D.

The first X polarization modulating unit 72A performs optical modulation on the X polarization I component included in the optical signal in accordance with the electrical signal at the RF electrode. Furthermore, the first X polarization modulating unit 72A performs phase modulation on the optical signal that has the I component and that has been subjected to the optical modulation in accordance with the electrical signal at the DC electrode, and outputs the optical signal that has the I component and that has been subjected to the phase modulation to the first multiplexing unit 73A. The second X polarization modulating unit 72B performs optical modulation on the X polarization Q component included in the optical signal in accordance with the electrical signal at the RF electrode. Furthermore, the second X polarization modulating unit 72B performs phase modulation on the optical signal that has the Q component that has been subjected to the optical modulation in accordance with the electrical signal at the DC electrode, and outputs the optical signal that has the Q component and that has been subjected to the phase modulation to the first multiplexing unit 73A. The first multiplexing unit 73A multiplexes the optical signal that has the X polarization I component and the optical signal that has the X polarization Q component, and outputs the multiplexed optical signal having the X polarized wave to the PBC 75.

The first Y polarization modulating unit 72C performs optical modulation on the Y polarization I component included in the optical signal in accordance with the electrical signal at the RF electrode. Furthermore, the first Y polarization modulating unit 72C performs phase modulation on the optical signal that has the Y polarization I component and that has been subjected to the optical modulation in accordance with the electrical signal at the DC electrode, and outputs the optical signal that has the I component and that has been subjected to the phase modulation to the second multiplexing unit 73B. The second Y polarization modulating unit 72D performs optical modulation on the Y polarization Q component included in the optical signal in accordance with the electrical signal at the RF electrode. Furthermore, the second Y polarization modulating unit 72D performs phase modulation on the optical signal that has the Y polarization Q component and that has been subjected to the optical modulation in accordance with the electrical signal at the DC electrode, and outputs the optical signal that has the Q component and that has been subjected to the phase modulation to the second multiplexing unit 73B. The second multiplexing unit 73B multiplexes the optical signal that has the Y polarization I component and the optical signal that has the Y polarization Q component, and outputs the multiplexed optical signal that has the X polarized wave to the second PR 74. The second PR 74 performs polarization rotation on the optical signal that has the Y polarized wave received from the second multiplexing unit 73B and, as a result, outputs the optical signal that has the X polarization to the PBC 75. Then, the PBC 75 multiplexes the optical signal that has the X polarized wave received from the first multiplexing unit 73A and the optical signal that has the X polarized wave received from the second PR 74, and outputs the multiplexed optical signal from the third EC 76 that includes the transmission port.

The optical chip 50 includes a 1-to-N coupler 94, a first variable optical attenuator (VOA) 96, a second VOA 97, a third VOA 105, and a fourth VOA 106. The optical chip 50 includes a first waveguide 91, a second waveguide 92, and a third waveguide 93. The optical chip 50 includes a fourth waveguide 95, a fifth waveguide 95A, and a sixth waveguide 95B. The optical chip 50 includes a seventh waveguide 101, an eighth waveguide 102, a ninth waveguide 103, a tenth waveguide 104, and an eleventh waveguide 107.

The first waveguide 91 is an optical waveguide that optically connects a portion between the first EC 61 and the 1-to-N coupler 94 and that guides waves of the local emission light that is being operated. The second waveguide 92 is an optical waveguide that optically connects a portion between a first test purpose fiber 82A and the 1-to-N coupler 94 and that guides waves of the local emission light that is used as a test purpose and that is received from the first test purpose fiber 82A. The third waveguide 93 is an optical waveguide that optically connects a portion between the 1-to-N coupler 94 and the first branching unit 71 and that guides waves of the local emission light to the transmitting circuit 51.

The fourth waveguide 95 is an optical waveguide that optically connects a portion between the second EC 62 and the PBS 63 and that guides waves of the reception light that is being operated. The fifth waveguide 95A is an optical waveguide that optically connects a portion between a second test purpose fiber 82B and the first VOA 96 and that guides waves of the reception light that has the Y component and that is used as a test purpose. The sixth waveguide 95B is an optical waveguide that optically connects a portion between a third test purpose fiber 82C and the second VOA 97 and that guides waves of the reception light that has the X component and that is used as a test purpose.

The seventh waveguide 101 is an optical waveguide that optically connects a portion between the third VOA 105 and the PBC 75 and that guides waves of the transmission light that has X component and that is being operated. The eighth waveguide 102 is an optical waveguide that optically connects a portion between the third VOA 105 and a fifth test purpose fiber 82E and that guides waves of the transmission light that has the X component and that is used as a test purpose. The ninth waveguide 103 is an optical waveguide that optically connects a portion between the fourth VOA 106 and the second PR 74 and that guides waves of the transmission light that has the Y component and that is being operated. The tenth waveguide 104 is an optical waveguide that optically connects a portion between the fourth VOA 106 and a fourth test purpose fiber 82D and that guides waves of the transmission light that has the Y component and that is used as a test purpose. The eleventh waveguide 107 is an optical waveguide that optically connects a portion between the third EC 76 and the PBC 75 and that guides waves of the transmission light that is being operated.

The optical chip 50 includes a first trench 81A, a second trench 81B, a third trench 81C, a fourth trench 81D, and a fifth trench 81E.

The first trench 81A is a trench that is used to optically connect a portion between the first test purpose fiber 82A and the second waveguide 92 as a result of the first test purpose fiber 82A being inserted into the first trench 81A. The second trench 81B is a trench that is used to optically connect a portion between the second test purpose fiber 82B and the fifth waveguide 95A as a result of the second test purpose fiber 82B being inserted into the second trench 81B. The third trench 81C is a trench that is used to optically connect a portion between the third test purpose fiber 82C and the sixth waveguide 95B as a result of the third test purpose fiber 82C being inserted into the third trench 81C.

The fourth trench 81D is a trench that is used to optically connect a portion between the fourth test purpose fiber 82D and the tenth waveguide 104 as a result of the fourth test purpose fiber 82D being inserted into the fourth trench 81D. The fifth trench 81E is a trench that is used to optically connect a portion between the fifth test purpose fiber 82E and the eighth waveguide 102 as a result of the fifth test purpose fiber 82E being inserted into the fifth trench 81E.

The first trench 81A, the second trench 81B, the third trench 81C, the fourth trench 81D and the fifth trench 81E are arranged on the optical chip 50 so as to be aligned on substantially the same line. In addition, each of the first trench 81A to the second waveguide 92, the second trench 81B to the fifth waveguide 95A, the third trench 81C to the sixth waveguide 95B, the fourth trench 81D to the eighth waveguide 102, and the fifth trench 81E to the tenth waveguide 104 is assumed to be a starting point. Therefore, the second waveguide 92, the fifth waveguide 95A, the sixth waveguide 95B, the eighth waveguide 102, and the tenth waveguide 104 are arranged at the same interval pitch in the same direction, so that it is possible to perform an evaluation using the fiber arrays, and it is thus possible to easily adjust the optical axis at the time of a test.

The 1-to-N coupler 94 is an optical coupler that includes an input port for connecting the first waveguide 91 and the second waveguide 92 and an output port for connecting the third waveguide 93 and a twelfth waveguide 98. The twelfth waveguide 98 is a waveguide for use in inputting the local emission light received from the 1-to-N coupler 94 or the test light associated with the local emission light to the first optical hybrid circuit 65A or the second optical hybrid circuit 65B.

The first VOA 96 includes an input port that is connected to the fifth waveguide 95A and the first PR 64 and an output port that is connected to the second optical hybrid circuit 65B. The first VOA 96 is a VOA that outputs the reception light that is used as a test purpose or the reception light that is being operated to the second optical hybrid circuit 65B.

The second VOA 97 includes an input port that is connected to the sixth waveguide 95B and the PBS 63 and an output port that is connected to the first optical hybrid circuit 65A. The second VOA 97 is a VOA that outputs the reception light that is used as a test purpose or the reception light that is being operated to the first optical hybrid circuit 65A.

The third VOA 105 includes an input port that is connected to the first multiplexing unit 73A and an output port that is connected to the seventh waveguide 101 and the eighth waveguide 102. The third VOA 105 is a VOA that outputs the transmission light that has the X polarized wave and that is used as a test purpose to the eighth waveguide 102 and that outputs the transmission light that has the X polarized wave and that is being operated to the seventh waveguide 101.

The fourth VOA 106 includes an input port that is connected to the second multiplexing unit 73B and an output port that is connected to the ninth waveguide 103 and the tenth waveguide 104. The fourth VOA 106 is a VOA that outputs the transmission light that has the Y polarized wave and that is used as a test purpose to the tenth waveguide 104 and that outputs the transmission light that has the Y polarized wave and that is being operated to the ninth waveguide 103.

In addition, the first trench 81A, the second trench 81B, the third trench 81C, the fourth trench 81D, and the fifth trench 81E are arranged on the optical chip 50 so as to be aligned on substantially the same line. Consequently, by using the fiber array, it is possible to easily perform an adjustment work of the optical axis at the time of a test, so that it is possible to improve enhancement of the working efficiency needed for a measurement test.

In addition, in the first trench 81A, the second trench 81B, the third trench 81C, the fourth trench 81D, and the fifth trench 81E, the waveguides that are associated with the respective trenches are arranged at the same interval in the same direction. Consequently, it is possible to perform an evaluation using the fiber array accommodating the five test purpose fibers, so that it is possible to easily perform the adjustment work of the optical axis at the time of a test.

Furthermore, the first VOA 96, the second VOA 97, the third VOA 105, and the fourth VOA 106 may have the configuration illustrated in FIG. 7A to FIG. 7D, and appropriate modifications are possible.

Figure 7A:
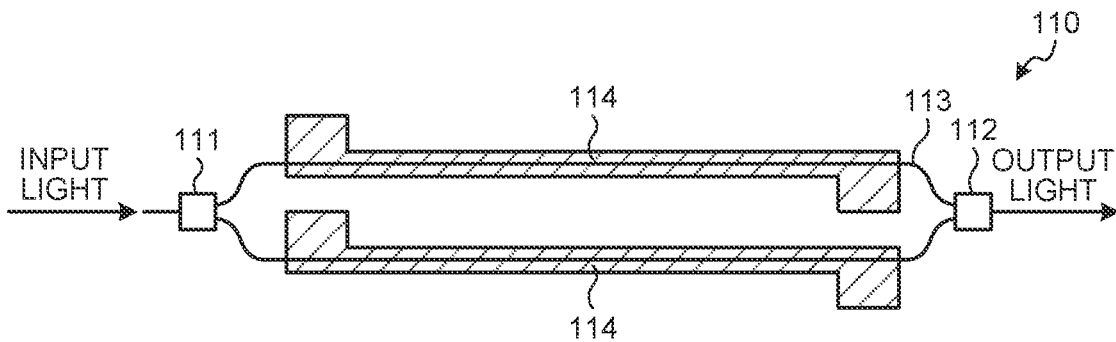
FIG. 7A is a diagram illustrating one example of a VOA.

FIG. 7A is a diagram illustrating one example of a VOA 110. The VOA 110 illustrated in FIG. 7A includes an input side branching unit 111, two waveguides 113, an output side multiplexing unit 112, and a heater electrode 114 that is arranged on each of the waveguides 113. The input side branching unit 111 is a 1×2 coupler. The output side multiplexing unit 112 is a 2×1 coupler. The VOA 110 heats both of the waveguides 113 by flowing an electric current through each of the associated heater electrodes 114, changes the refractive index of each of the waveguides 113 in accordance with the thermo-optical effect, and changes the intensity of the output light in accordance with the phase difference between the light waves passing through the respective arms of a Mach-Zehnder. Consequently, a branching ratio is adjusted by changing the intensity of the output light in accordance with the phase difference between the light waves passing through the respective arms.

Figure 7B:
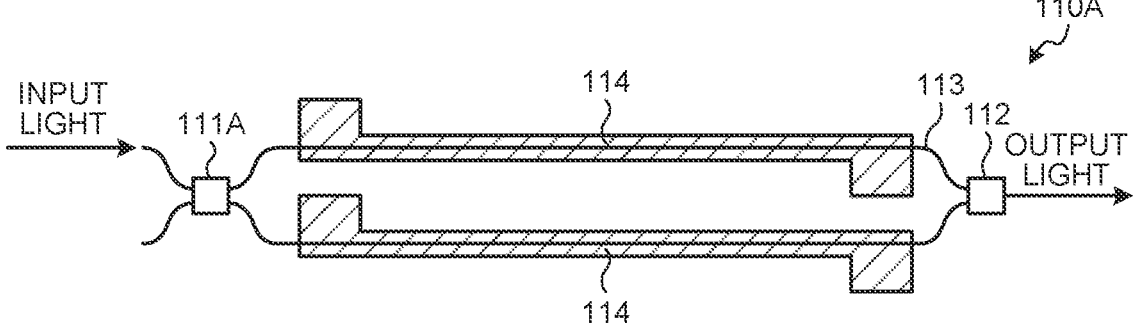
FIG. 7B is a diagram illustrating one example of a VOA.

FIG. 7B is a diagram illustrating one example of a VOA 110A. The VOA 110A illustrated in FIG. 7B includes an input side branching unit 111A, the two waveguides 113, an output side multiplexing unit 112, and the heater electrode 114 that is arranged on each of the waveguide 113. The input side branching unit 111A is a 2×2 coupler. The output side multiplexing unit 112 is a 2×1 coupler. The VOA 110A heats both of the waveguides 113 by flowing an electric current through each of the associated heater electrodes 114, changes the refractive index of each of the waveguides 113 in accordance with the thermo-optical effect, and changes the intensity of the output light in accordance with the phase difference between the light waves passing through the respective arms of the Mach-Zehnder. Consequently, a branching ratio is adjusted by changing the intensity of the output light in accordance with the phase difference between the light waves passing through the respective arms. The VOA 110A illustrated in FIG. 7B is able to be used for, for example, the first VOA 96 and the second VOA 97.

Figure 7C:
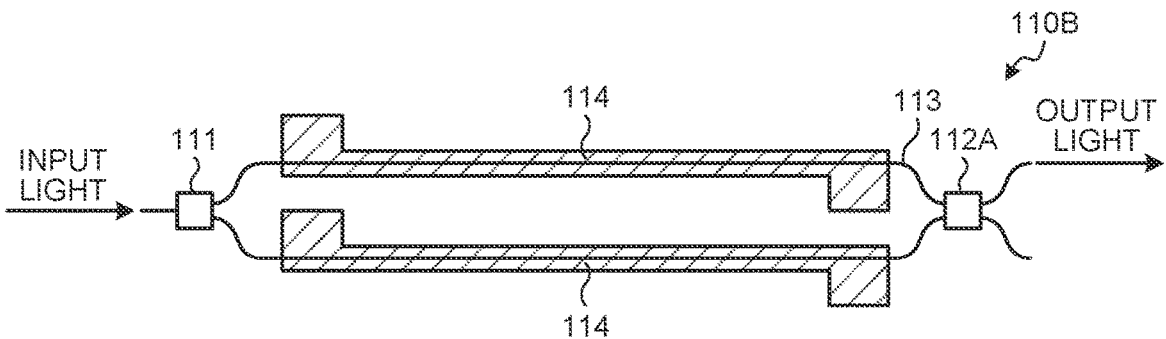
FIG. 7C is a diagram illustrating one example of a VOA.

FIG. 7C is a diagram illustrating one example of a VOA 110B. The VOA 110B illustrated in FIG. 7C includes the input side branching unit 111, the two waveguide 113, an output side multiplexing unit 112A, and the heater electrode 114 that is arranged on each of the waveguides 113. The input side branching unit 111 is a 1×2 coupler. The output side multiplexing unit 112A is a 2×2 coupler. The VOA 110B heats both of the waveguides 113 by flowing an electric current through each of the associated heater electrodes 114, changes the refractive index of each of the waveguides 113 in accordance with the thermo-optical effect, and changes the intensity of the output light in accordance with the phase difference between the light waves passing through the respective arms of the Mach-Zehnder. Consequently, a branching ratio is adjusted by changing the intensity of the output light in accordance with the phase difference between the light waves passing through the respective arms. The VOA 110B illustrated in FIG. 7C is able to be used for, for example, the third VOA 105 and the fourth VOA 106.

In addition, each of the VOA 110A illustrated in FIG. 7B and the VOA 110B illustrated in FIG. 7C has a different coupler type that is used in the input side branching unit and the output side multiplexing unit, the extinction ratio is degraded as a result of the branching ratio and the multiplexing ratio being different. For example, the 1×2 coupler has a symmetrical structure, so that the branching ratio does not deviate from 1:1 but, in some cases, the branching ratio of the 2×2 coupler deviates from 1:1 caused by a manufacturing error or the like. For example, when the branching ratio of the 2×2 coupler is 1:N (N<1, N>1), the light passing through the two waveguides interfere with each other at the intensity ratio of 1:N, so that the two light waves are not completely canceled out even if the phase difference between the two light waves is n. Consequently, some light remains, and thus, the extinction ratio is degraded. Accordingly, in order to cope with the circumstances, a VOA 110C illustrated in FIG. 7D may be used.

Figure 7D:
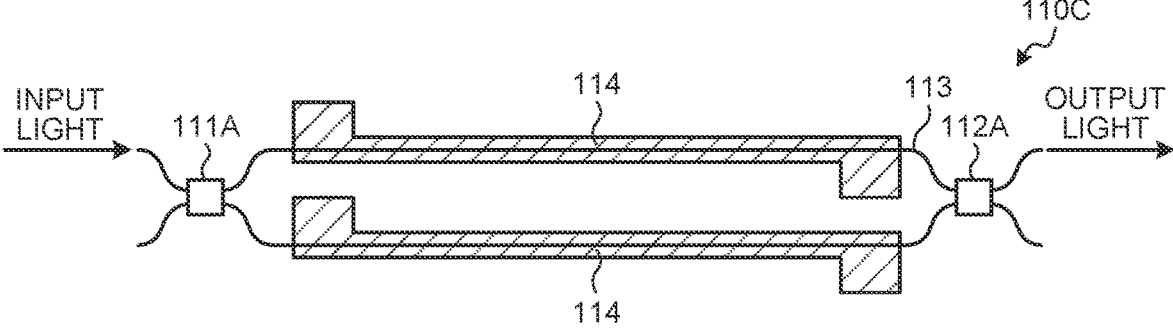
FIG. 7D is a diagram illustrating one example of a VOA.

FIG. 7D is a diagram illustrating one example of the VOA 110C. The VOA 110C illustrated in FIG. 7D includes the input side branching unit 111A, the two waveguides 113, the output side multiplexing unit 112A, and the heater electrode 114 that is arranged on each of the waveguides 113. The input side branching unit 111A is a 2×2 coupler. The output side multiplexing unit 112A is a 2×2 coupler. The VOA 110C heats both of the waveguides 113 by flowing an electric current through each of the associated heater electrodes 114, changes the refractive index of each of the waveguides 113 in accordance with the thermo-optical effect, and changes the intensity of the output light in accordance with the phase difference between the light waves passing through the respective arms of the Mach-Zehnder. Consequently, a branching ratio is adjusted by changing the intensity of the output light in accordance with the phase difference between the light waves passing through the respective arms. Furthermore, the input side branching unit 111A and the output side multiplexing unit 112A have the same coupler type, it is possible to improve the extinction ratio. The VOA 110C illustrated in FIG. 7D is also able to be used for, for example, the first VOA 96, the second VOA 97, the third VOA 105, and the fourth VOA 106.

In other words, the VOA 110C is constituted such that each of the input side branching unit 111A and the output side multiplexing unit 112A is the 2×2 coupler, so that if the branching ratio of the 2×2 coupler deviates from 1:1 caused by a manufacturing error or the like, it is possible to compensate the deviation of the branching ratio of an input side and an output side. That is, even if the branching ratio of the 2×2 coupler on the input side is 1:N (N<1, N>1), if the branching ratio of the 2×2 coupler on the output side is 1:N, the light waves passing through the two waveguides interfere with each other at the same intensity, so that the two light waves are completely canceled out when the phase difference between the light waves is n. In other words, the extinction ratio is accordingly improved.

Figure 8:
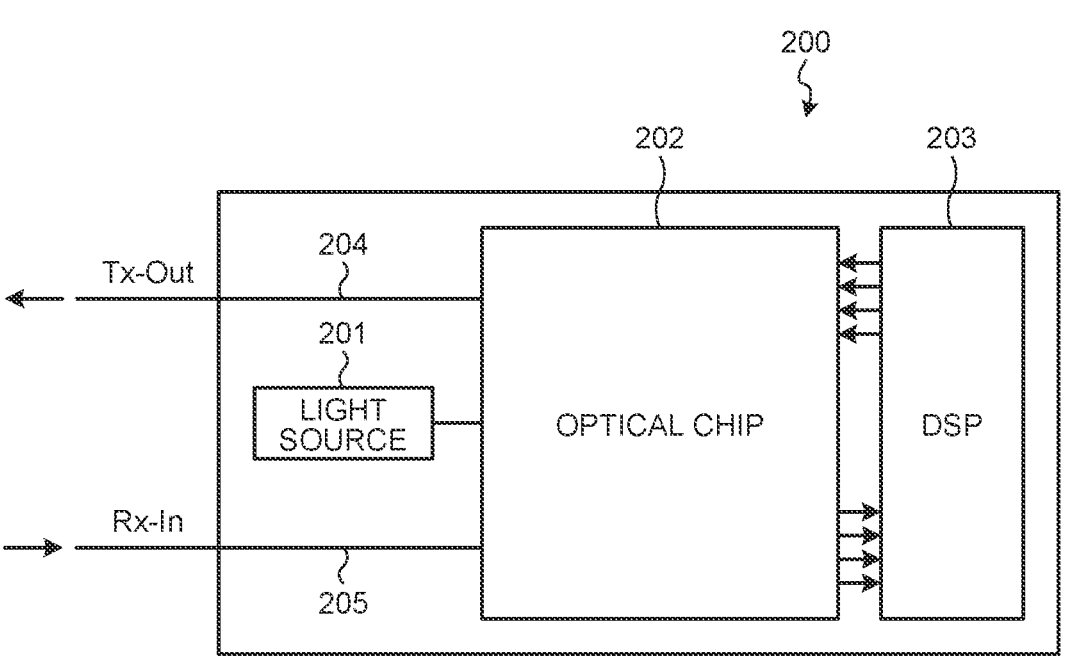
FIG. 8 is a diagram illustrating one example of an optical device on which an optical chip is mounted.
Figure 9:
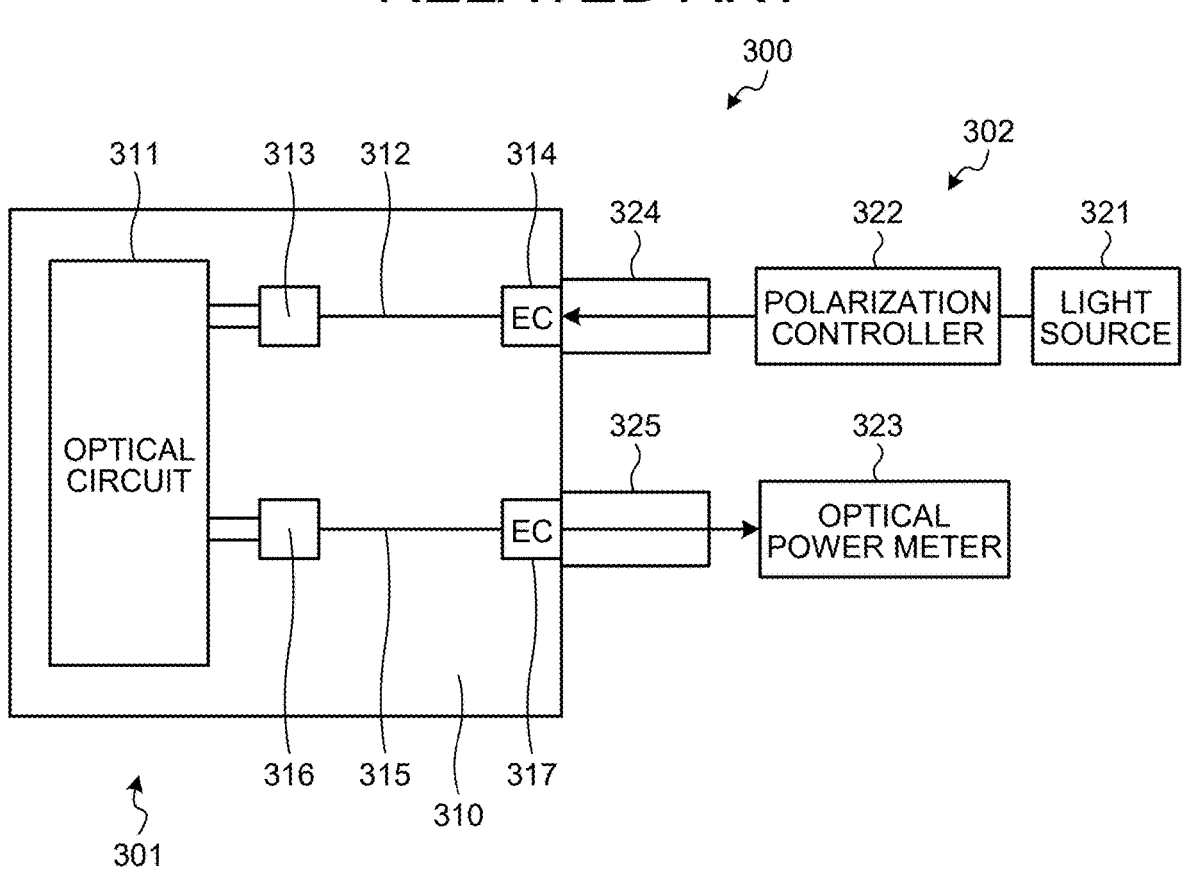
FIG. 9 is a diagram illustrating one example of a test system that is conventionally used.
Figure 10:
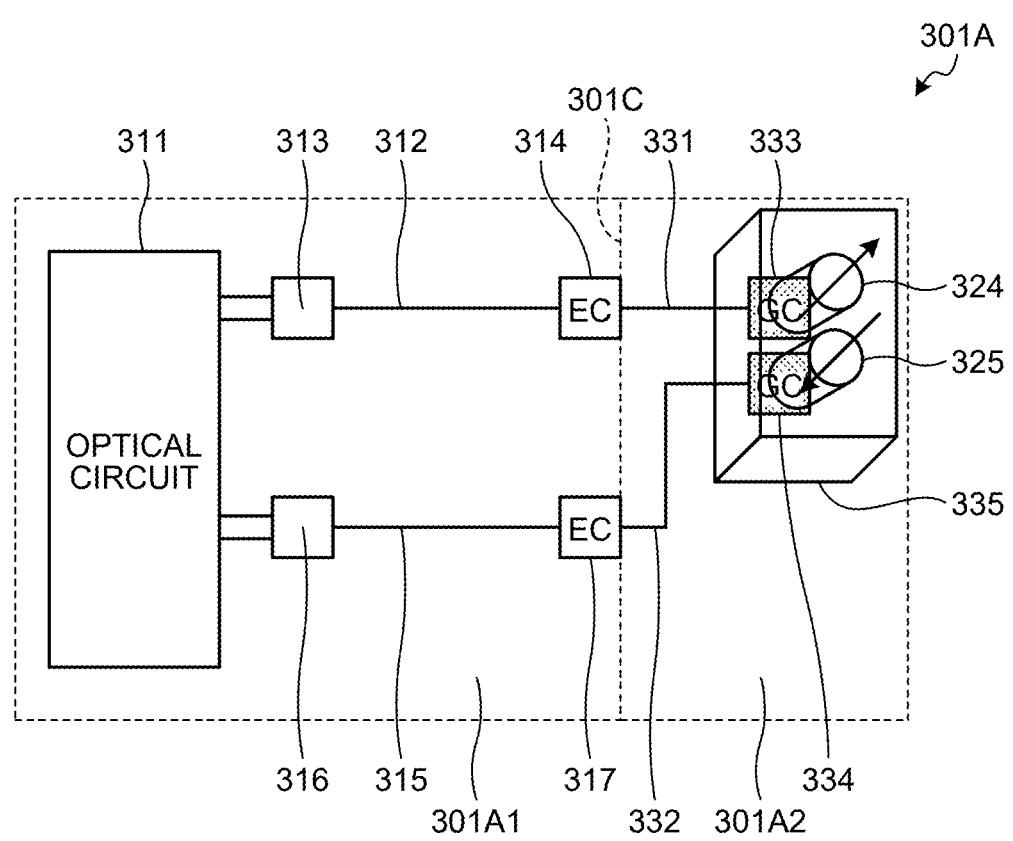
FIG. 10 is a diagram illustrating one example of an optical chip that is conventionally used.
Figure 11:
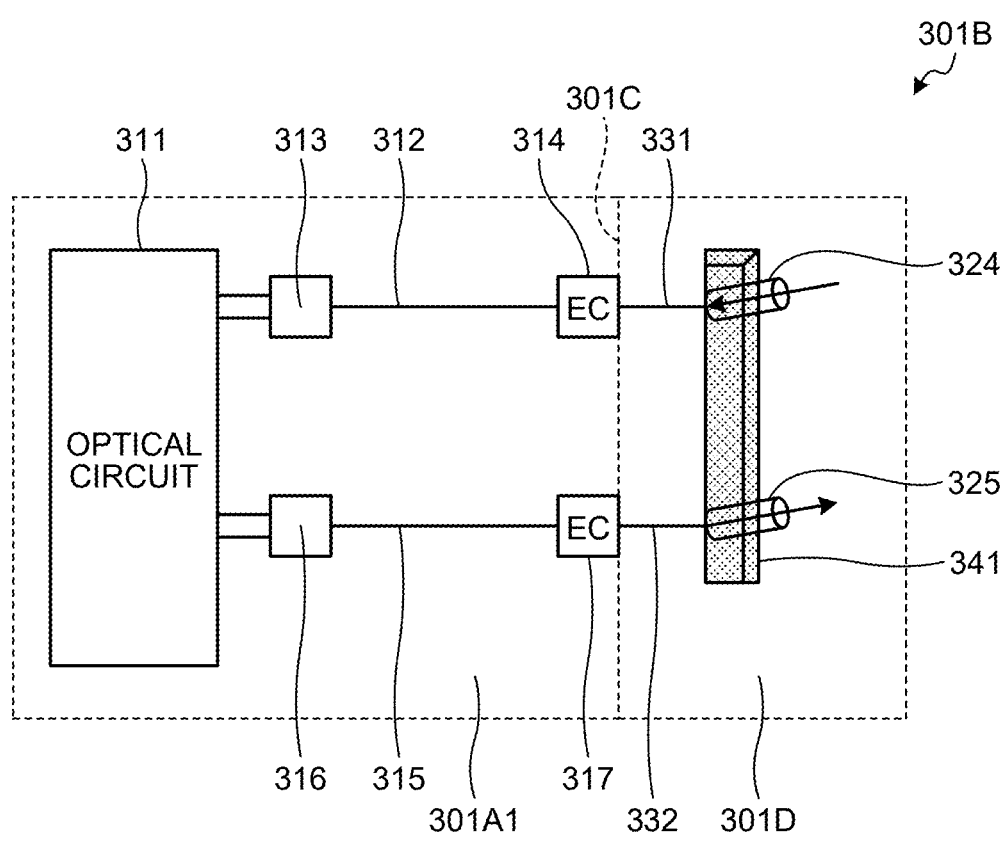
FIG. 11 is a diagram illustrating one example of an optical chip that is conventionally used.

FIG. 8 is a block diagram illustrating one example of an optical communication apparatus 200 according to the present embodiment. The optical communication apparatus 200 illustrated in FIG. 8 is, for example, an optical coherent transmitter/receiver that is connected to an optical fiber 204 that is disposed on the output side and an optical fiber 205 that is disposed on the input side, both of which are optical fibers that are being operated. The optical communication apparatus 200 includes a light source 201, an optical chip 202, and a digital signal processor (DSP) 203. The optical chip 202 is, for example, the optical chip 50 illustrated in FIG. 6.

The DSP 203 is an electrical component that performs digital signal processing. The DSP 203 performs a process of, for example, encoding the transmission data or the like, and outputs a data signal corresponding to the processed transmission data to the transmitting circuit included in the optical chip 202. In addition, the DSP 203 performs a process of, for example, decoding or the like on the reception data that has been obtained from the receiving circuit included in the optical chip 202 and that corresponds to the data signal.

The light source 201 is, for example, an integrated tunable laser assembly (ITLA) that includes, for example, a wavelength-tunable laser diode or the like, that emits light at a predetermined wavelength, and that supplies the light to both of the optical modulator that is included in the transmitting circuit and optical receiver that is included in the receiving circuit.

In addition, for convenience of description, a case has been described as an example in which the optical chip 202 includes both of the transmitting circuit and the receiving circuit as the built in units; however, the optical chip 202 may include one of the transmitting circuit and the receiving circuit as a built in unit. In the case where the optical chip 202 includes only the transmitting circuit as a built in unit, the optical chip 202 functions as an optical transmitter, whereas, in the case where the optical chip 202 includes only the receiving circuit, the optical chip 202 functions as an optical receiver.

In addition, the optical fiber array may be fixed on a wafer prober, and a wafer mounted on the wafer prober may move up, down, left, and right with respect to the optical fiber array, or the optical fiber array may move up, down, left, and right on the wafer, and appropriate modifications are possible.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

Furthermore, all or any part of various processing functions performed by each unit may also be executed by a central processing unit (CPU) (or, a microcomputer, such as a micro processing unit (MPU) or a micro controller unit (MCU)). In addition, all or any part of various processing functions may also be, of course, executed by programs analyzed and executed by the CPU (or the microcomputer, such as the MPU or the MCU), or executed by hardware by wired logic.

According to an aspect of an embodiment, test accuracy is improved while ensuring the number of optical chips per wafer.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical chip including a chip area located on a wafer and an optical circuit arranged in the chip area, the optical chip comprising:
a first waveguide that is connected to a first operational fiber;
a second waveguide;
a first coupler that includes
a first port that is connected to the first waveguide and that is connected to the second waveguide, and
a second port that is connected to the optical circuit;
a first trench that is formed on a surface of the chip area and that is connected to the second waveguide;
a third waveguide that is connected to a second operational fiber;
a fourth waveguide;
a second coupler that includes
a third port that is connected to the third waveguide and that is connected to the fourth waveguide, and
a fourth port that is connected to the optical circuit; and
a second trench that is formed on the surface of the chip area and that is connected to the fourth waveguide; and
wherein
the first trench in which a first test purpose fiber is inserted is connected to the second waveguide, and
the second trench in which a second test purpose fiber is inserted is connected to the fourth waveguide.

2. The optical chip according to claim 1, wherein the optical chip includes at least one of waveguides of
the second waveguide that is arranged such that the second waveguide is not orthogonal to a side surface among side surfaces of the first trench and that is connected to the second waveguide, and
the fourth waveguide that is arranged such that the fourth waveguide is not orthogonal to a side surface that is included in the side surfaces of the second trench and that is connected to the fourth waveguide.

3. The optical chip according to claim 2, wherein the optical chip includes at least one of trenches of
the first trench that is arranged such that the side surface of the first trench connected to the second waveguide is arranged at a position inclined with respect to a side of the chip area, and
the second trench that is arranged such that the side surface of the second trench connected to the fourth waveguide is arranged at a position inclined with respect to a side of the chip area.

4. The optical chip according to claim 1, further including:
a first edge coupler that is connected to at least one of the second waveguide and the first test purpose fiber that is inserted inside of the first trench; and
a second edge coupler that is connected to at least one of the fourth waveguide and the second test purpose fiber that is inserted inside of the second trench.

5. The optical chip according to claim 1, wherein the first port is among a plurality of first ports, the second port is among a plurality of second ports, the third port is among a plurality of third ports, and the fourth port is among a plurality of fourth ports, and the optical chip includes at least one coupler among couplers of
the first coupler that is a 2×2 coupler in which a number of the plurality of first ports is two and a number of the plurality of second ports is two, and
the second coupler that is a 2×2 coupler in which a number of the plurality of third ports is two and a number of the plurality of fourth ports is two.

6. The optical chip according to claim 1, wherein the first port is among a plurality of first ports, the second port is among a plurality of second ports, the third port is among a plurality of third ports, and the fourth port is among a plurality of fourth ports, and the optical chip includes at least one coupler among couplers of the first coupler that is a variable attenuator having a Mach-Zehnder structure in which a number of the plurality of first ports is two and a number of the plurality of second ports is one, and the second coupler that is a variable attenuator having a Mach-Zehnder structure in which a number of the plurality of third ports is two and a number of the plurality of fourth ports is one.

7. An optical communication apparatus comprising:

an optical chip that includes a chip area located on a wafer and an optical circuit arranged in the chip area, wherein the optical circuit includes a first modulator, a second modulator, a first receiver, and a second receiver, and the chip area includes a first waveguide that is connected to a first operational fiber that is used for local emission light, a second waveguide, a first coupler that includes a first port that is connected to the first waveguide and that is connected to the second waveguide, and a second port that is connected to the optical circuit, a first trench that is formed on a surface of the chip area and that is connected to the second waveguide, a third waveguide that is connected to a second operational fiber that is used for reception light, a fourth waveguide, a second coupler that includes a third port that is connected to the third waveguide and that is connected to the fourth waveguide, and a fourth port that is connected to the first receiver, a second trench that is formed on the surface of the chip area and that is connected to the fourth waveguide, a fifth waveguide, a third coupler that includes a fifth port that is connected to the third waveguide and that is connected to the fifth waveguide, and a sixth port that is connected to the second receiver, a third trench that is formed on the surface of the chip area and that is connected to the fifth waveguide, a sixth waveguide that is connected to a third operational fiber that is used for transmission light, a seventh waveguide, a fourth coupler that includes a seventh port that is connected to the sixth waveguide and that is connected to the seventh waveguide, and an eighth port that is connected to the first modulator, a fourth trench that is formed on the surface of the chip area and that is connected to the seventh waveguide, an eighth waveguide, a fifth coupler that includes a ninth port that is connected to the sixth waveguide and that is connected to the eighth waveguide, and a tenth port that is connected to the second modulator, and a fifth trench that is formed on the surface of the chip area and that is connected to the eighth waveguide.

8. The optical communication apparatus according to claim 7, wherein the first trench in which a first test purpose fiber is inserted is connected to the second waveguide, the second trench in which a second test purpose fiber is inserted is connected to the fourth waveguide, the third trench in which a third test purpose fiber is inserted is connected to the fifth waveguide, the fourth trench in which a fourth test purpose fiber is inserted is connected to the seventh waveguide, and the fifth trench in which a fifth test purpose fiber is inserted is connected to the eighth waveguide.

9. The optical communication apparatus according to claim 7, wherein the first trench, the second trench, the third trench, the fourth trench, and the fifth trench are arranged on substantially a same line in the chip area.

10. The optical communication apparatus according to claim 7, wherein the second waveguide, the fourth waveguide, the fifth waveguide, the seventh waveguide, and the eighth waveguide are arranged at a same interval pitch in a same direction.

11. An optical receiver comprising an optical chip that includes a chip area located on a wafer and an optical circuit arranged in the chip area, wherein the optical circuit includes a first receiver, and a second receiver, and the chip area includes a first waveguide that is connected to a first operational fiber that is used for local emission light, a second waveguide, a first coupler that includes a first port that is connected to the first waveguide and that is connected to the second waveguide, and a second port that is connected to the optical circuit, a first trench that is formed on a surface of the chip area and that is connected to the second waveguide, a third waveguide that is connected to a second operational fiber that is used for reception light, a fourth waveguide, a second coupler that includes a third port that is connected to the third waveguide and that is connected to the fourth waveguide, and a fourth port that is connected to the first receiver, a second trench that is formed on the surface of the chip area and that is connected to the fourth waveguide, a fifth waveguide, a third coupler that includes a fifth port that is connected to the third waveguide and that is connected to the fifth waveguide, and a sixth port that is connected to the second receiver, and a third trench that is formed on the surface of the chip area and that is connected to the fifth waveguide.

12. The optical receiver according to claim 11, wherein the first trench in which a first test purpose fiber is inserted is connected to the second waveguide, the second trench in which a second test purpose fiber is inserted is connected to the fourth waveguide, and the third trench in which a third test purpose fiber is inserted is connected to the fifth waveguide.

13. An optical transmitter comprising an optical chip that includes a chip area located on a wafer, and an optical circuit arranged in the chip area, wherein the optical circuit includes a first modulator, and a second modulator, and the chip area includes a first waveguide that is connected to a first operational fiber that is used for local emission light, a second waveguide, a first coupler that includes a first port that is connected to the first waveguide and that is connected to the second waveguide, and a second port that is connected to the optical circuit, a first trench that is formed on a surface of the chip area and that is connected to the second waveguide, a third waveguide that is connected to a second operational fiber that is used for transmission light, a fourth waveguide, a second coupler that includes a third port that is connected to the third waveguide and that is connected to the fourth waveguide, and a fourth port that is connected to the first modulator, a second trench that is formed on the surface of the chip area and that is connected to the fourth waveguide, a fifth waveguide, a third coupler that includes a fifth port that is connected to the third waveguide and that is connected to the fifth waveguide, and a sixth port that is connected to the second modulator, and a third trench that is formed on the surface of the chip area and that is connected to the fifth waveguide.

14. The optical transmitter according to claim 13, wherein the first trench in which a first test purpose fiber is inserted is connected to the second waveguide, the second trench in which a second test purpose fiber is inserted is connected to the fourth waveguide, and the third trench in which a third test purpose fiber is inserted is connected to the fifth waveguide.

\* \* \* \* \*